United States Patent Office 3,438,702
Patented Apr. 15, 1969

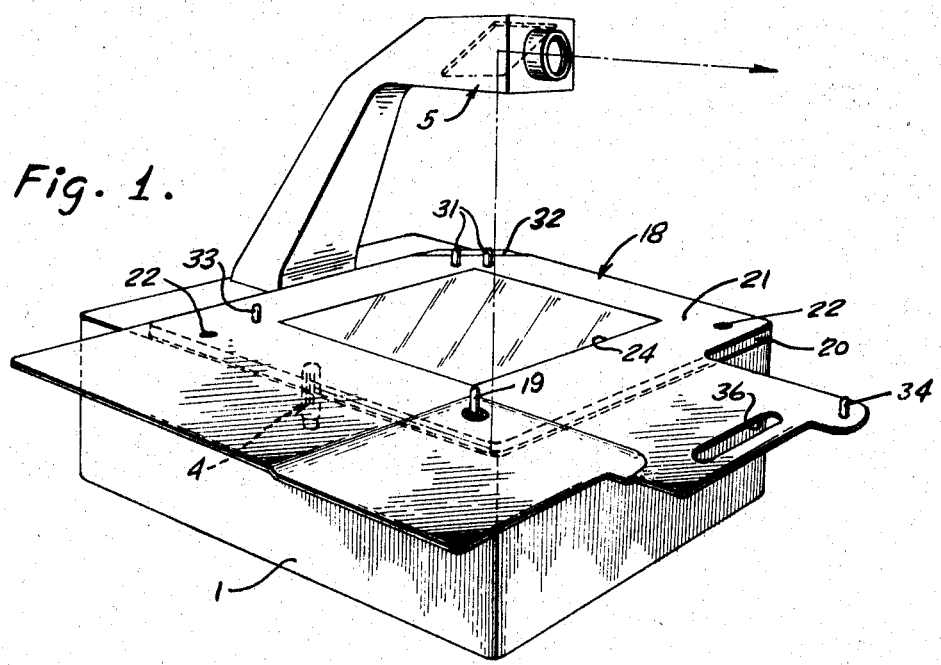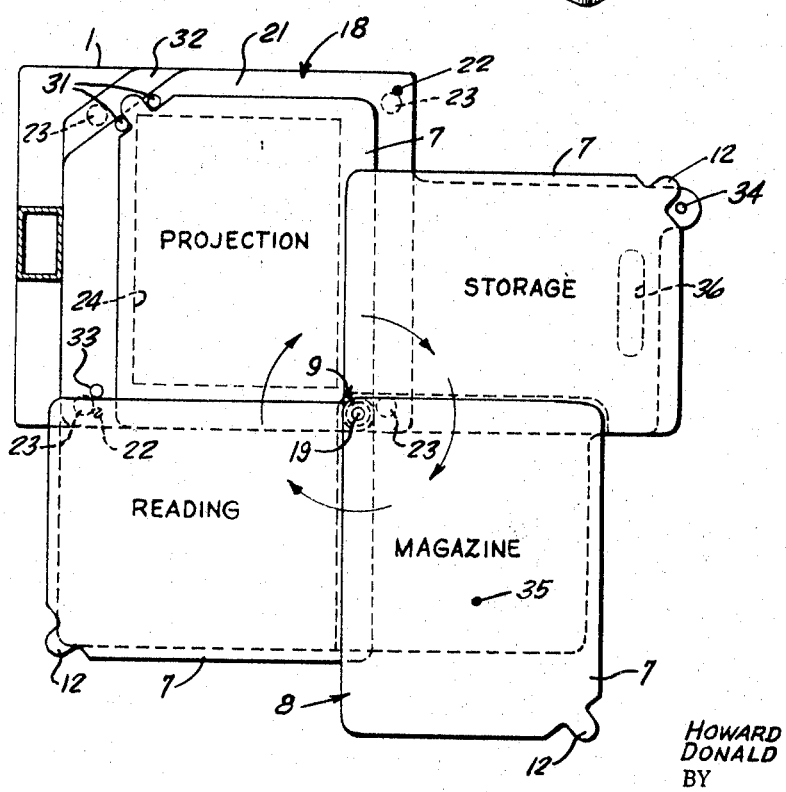

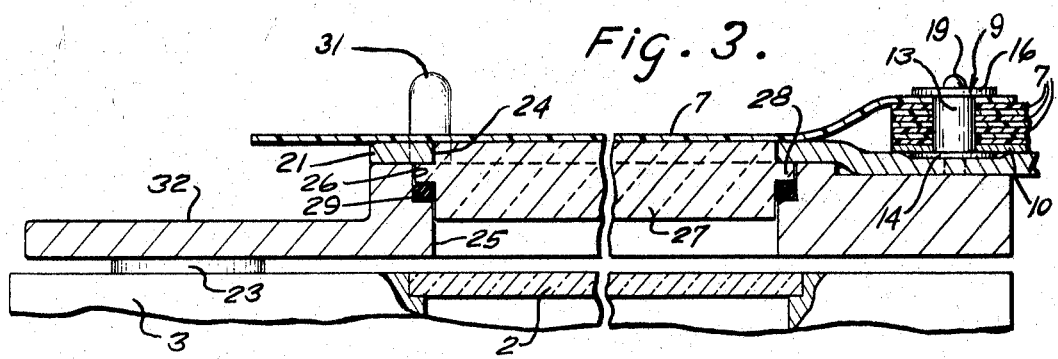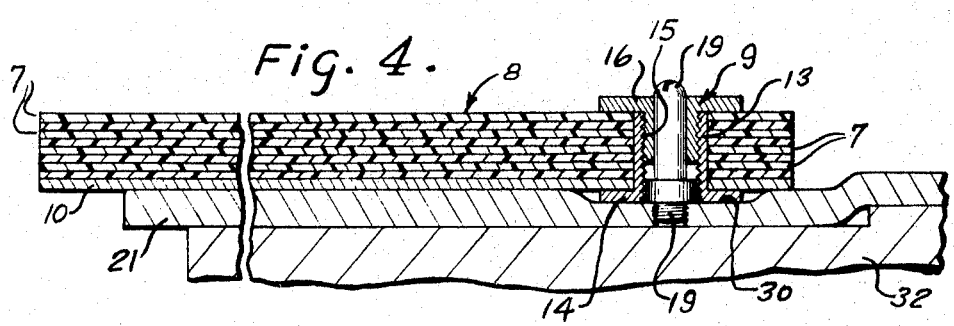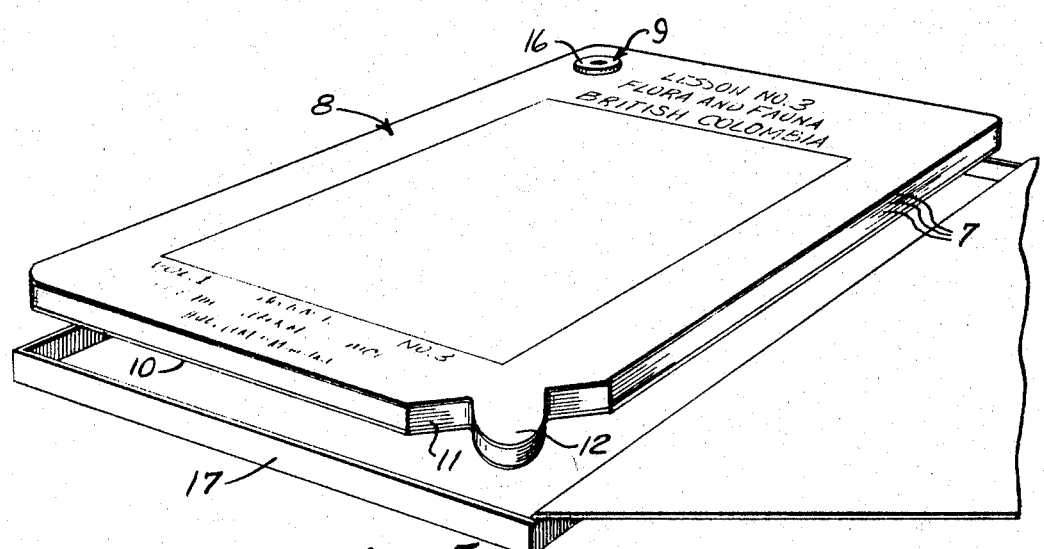

3,438,702
TRANSPARENCY PROJECTING ACCESSORY
Howard A. Milhaupt, Milwaukee, and Donald S. Henning, Hartland, Wis., assignors to Carl W. Winnemann, Mequon, Wis.
Filed Nov. 28, 1966, Ser. No. 597,334
Int. Cl. G03b 21/26
U.S. Cl. 353—35                    10 Claims

ABSTRACT OF THE DISCLOSURE

A projecting accessory for an overhead projector comprising a separate projector stage and a magazine of transparencies releasably mounted directly to the stage. The magazine includes transparencies interconnected to a self-supporting plate at one corner by a tubular pivot unit which includes a pair of releasable elements. The stage includes a heavy base portion adapted to rest on the top of the projector and a relatively light member having a planar top surface projecting outwardly therefrom to define a magazine support portion, a reading portion, and a transmitting portion overlying the overhead projector transmitting window and a storage portion.

---

This invention relates to an accessory for a projector and particularly to a means for mounting and interconnecting transparencies or the like for viewing by an overhead projector.

In the copending application of Carl W. Winnemann entitled, Transparency Projection Accessory, Ser. No. 597,335 filed Nov. 28, 1966 and assigned to the same assignee, a highly novel and versatile pivotal type of magazine transparencies is disclosed as an accessory for an overhead projector or similar device. As disclosed therein, the magazine of transparencies includes a corner pivot connection and means for releasably mounting of the transparencies adjacent the viewing window of an overhead projector. The magazine of transparencies is releasably mounted to the projector for presentation of the transparencies, singly or simultaneously in groups of overlying transparencies.

The present invention is particularly directed to a similar method of presentation and particularly to improvements in the structure of a separate stage and the magazine of transparencies for releasably mounting of the magazine to the stage for transmission of individual transparencies or any desired combination thereof.

The magazine includes a plurality of transparencies interconnected to a bottom support member which is of a relatively heavy material and which is at least semi-self-supporting. The transparencies are interconnected to the device by a tubular pivot unit which includes a pair of releasable means to permit disassembly of the transparencies from the pivot unit. A bottom wall may be staked to the pin unit to provide a very rigid interconnection therebetween.

In accordance with the present invention, the separate stage provided for mounting to the projector includes a heavy base portion adapted to rest on the top of the projector and a relatively light member having a planar top surface projecting outwardly therefrom to define a magazine support portion, a reading portion to which reading sheets can be pivoted, a transmitting portion overlying the overhead projector transmitting window and a storage portion. The transmitting portion includes a viewing opening essentially corresponding to the size of the transparencies such that the light which is transmitted is directly through the transparencies and there is no peripheral dispersion of light. A pivot pin adapted to receive the tubular pivot unit of a magazine is secured to the center of the stage where the several portions merge into each other.

The relatively heavy base section permits mounting of the stage directly on the projector in a very stable manner without the necessity of any additional clamps or separate attachment means. The stage is particularly constructed for magazines of a standardized size such that the outer periphery of the magazine support portion is disposed outwardly of the center of gravity of the magazine. The stage is preferably made as small as possible to permit convenient manipulation of the transparencies. The magazine support section is depressed generally in accordance with the supporting bottom wall of the magazine such that the transparencies can be retained therein but will allow free pivotal or swinging movement of the transparencies into the other respective sections or portions.

Further, in accordance with an important aspect of the present invention, the transparencies are provided with a locating tab means which are adapted to mate with a pair of locating, guide or gauge post members projecting upwardly from the viewing stage. The combination of the pivot means, the gauge post members and the locating tab means have been found to provide means for highly accurate locating of transparencies on the viewing sections, particularly in superimposed positions. The storage section of this stage is also preferably provided with a stop member such that the transparencies can be rapidly located in the storage area adjacent the magazine.

The present invention has been found to provide a highly practical and economical method of providing means readily adapted to use with various projectors without any necessary modification to the projector.

The drawings furnished herewith illustrate a preferred construction of the present invention in which the above advantages and features are clearly disclosed as well as others which will be clear from the following description.

In the drawings:

FIG. 1 is a pictorial view of an overhead projector and a presentation stage constructed in accordance with the present invention;

FIG. 2 is a top elevational view with a magazine of transparencies mounted on the stage;

FIG. 3 is an enlarged sectional view taken generally on line 3—3 of FIG. 2 to show details of the stage construction;

FIG. 4 is an enlarged sectional fragmentary view illustrating the mounting of a magazine on the stage; and FIG. 5 is a perspective view of a magazine of transparencies.

Referring to the drawings and particularly to FIG. 1, an overhead projector 1 similar to that of the previously referred to copending application is shown having a light transmitting transparent portion or window 2 in the upper wall of a supporting housing 3. A lamp and light directing assembly 4 is disposed beneath the window 2 and transmits light upwardly therethrough. A mirror and lens overhead unit 5 is mounted in upwardly spaced alignment with the window 2. The overhead unit 5 transmits the light horizontally or upwardly in accordance with any desired positioning of unit 5 into engagement with a suitable viewing screen, wall or the like, not shown. Transparencies 7 are placed, separately or in superposed groups, over the window 2 to transmit the information carried thereby onto the screen. Suitable supporting legs or a table, not shown, are normally provided to locate the upper wall of the housing at a convenient height for placement of the transparencies while standing adjacent the projector.

The transparencies 7 are generally clear plastic sheets measuring about 8½ by 11 inches and having information printed or otherwise applied thereon and are bound as a special magazine 8 of related transparencies. Additionally, reference reading sheets may be interposed within the stack of transparencies and referred to while showing certain transparencies. Suitable indexing cutouts, not shown, may also be provided along an edge of the transparencies 7 for rapid reference purposes.

The particular informational material on the transparencies, the material from which the transparencies are formed and the construction of the overhead projector are known and consequently no further description thereof is given.

The magazine 8 of transparencies 7 includes a special tubular pivot unit 9 in the one corner, shown as the upper left-hand corner of the group of transparencies, interconnecting the transparencies 7 to each other and to a base wall or plate 10 of relatively heavy paper, plastic or other suitable material. The corner of the base wall 10 diagonally opposite the pivot unit 9 is removed as at 11 and the corresponding corner of each transparency and reading sheet is provided with a locating or gauge tab 12 for accurate location of the transparency, as hereinafter described.

In the illustrated embodiment of the invention, the pivot unit 9 includes a tubular shank or sleeve 13 projecting upwardly through the magazine stack and having an enlarged clamping head 14 adjacent the bottom wall or cover 10. The tubular sleeve 13 is internally threaded at the outer end to releasably receive a tubular clamping bolt 15 which threads into the sleeve 9 with the head 16 of bolt 15 defining an overlying flange on the upper page of the magazine 8.

The length of the magazine pivot unit 9 may be standardized to produce a magazine of maximum thickness. If a lesser number of transparencies, reading and indexing sheets and the like are employed, it does not affect the use of the magazine. The use of a standardized pivot unit 9 obviously is advantageous from the standpoint of economy. If a program is exceptionally large, more than one magazine may of course be employed.

This group of transparencies may be housed in any suitable supporting box-like structure 17 for storage and transportation; for example, as shown in FIG. 5.

A special projector mounted stage 18 adapts any of the many presently available projectors for presentation of a magazine 8 which is constructed in accordance with this invention.

The illustrated stage 18 is generally a rectangular flat member divided into quadrants or sections identified in FIG. 2 as a "magazine" quadrant, a "reading" quadrant, a "presentation" quadrant and a "storage" quadrant and having a generally centrally located pivot pin 19 over which the tubular pivot sleeve 13 of a magazine 8 is dropped to support the magazine in proper position for presentation of transparencies 7.

The illustrated stage includes a relatively heavy base 20 generally conforming to the upper wall of the known projectors 1 and aligned with the "presentation" quadrant. A rectangular member 21 which may be formed of aluminum, plastic or other lightweight material is secured to the top of the base 20 by small screws 22 or the like. The stage 18 is adapted to be positioned with the base on the projector and held thereto by its own weight. Small rubber feet members 23 are shown secured to the underside of the base 20 to restrict shifting of the stage 8, and compensate for discrepancies in parallelism between projector top and stage bottom, as well as to project the upper wall of the projector 1.

The presentation quadrant is provided with an opening 24 in member 21 somewhat smaller than the size of the projector window 2 and the transparency 7 and with the stage 18 properly positioned on the projector aligned with the projector window 2. In the illustrated embodiment of the invention, the base 20 is provided with an appropriate opening 25 having an upper clamping recess 26. A plexiglass sheet 27 is provided with an intermediate flange 28 mating with the clamping recess 26. A cushion or gasket 29 is disposed between the flange 28 and the base of the recess and the sheet 27 is forced downwardly by the securement of the member 21 to the base such that the upper surface of the plastic sheet 27 is in the same plane as the upper surface of the member 21 to present a smooth continuous surface.

With the stage 18 resting on the projector 1 and the plastic sheet 27 aligned with the projector window 2 as viewed in FIGS. 1–3, the magazine quadrant extends outwardly on a diagonal line through the sheet 27, the reading quardant is to the left of the magazine quadrant along the one edge of the presentation quadrant and the storage quadrant adjacent the opposite edge of the presentation quadrant. The pivot pin 19 is located on the extension of such diagonal line and forms a common portion to all such quadrants. The member 21 if formed with a small depression 30 about the pin 19 to accommodate the lower head 14 of the sleeve 13.

The magazine section or quadrant is depressed generally in accordance with the thickness of the bottom wall 10 of the transparency magazine 8 such that with the pack of transparencies located with the tubular sleeve 13 overlying the pivot pin 19, the lowermost transparency 7 lies in the top plane of the stage.

A pair of locating or gauge posts 31 is secured in the projection quadrant of the stage 18 immediately adjacent to the opposite edges of the corner of the viewing window diagonally opposite from the pivot pin 9. The two posts 31 are spaced to the opposite sides of the previously referred to diagonal line to define a locating means cooperative with tab 12 integrally formed on the outer corner of the transparencies 7. The pivot connection of pin 19 and unit 9 in combination with the gauge posts precisely locates a transparency 7 over the viewing window. If two or more transparencies are disposed over the viewing window with the tabs 12 located between the gauge posts 21, they are mounted in a precise predetermined overlying relationship. As a result, interrelated diagrams and the like may be presented in a highly accurate manner.

The corner of the base 20 immediately adjacent to the posts 31 is preferably offset or recessed as at 32 to provide convenient placement and removal of a tab 12 between the gauge posts 31.

The reading portion or quadrant of the stage 18 is a continuous planar portion. Although it has not been found necessary as a practical matter, a stop pin 33 may be located generally on the outer portion of the edge between the reading and projecting quadrant. Thus, a reference page or subgroup of related transparencies can be easily and conveniently pivoted onto the reading quadrant abutting the stop pin. In this position, the lecturer's notes are conveniently displayed for reference purposes and the transparencies are disposed for convenient movement.

The storage quadrant is similarly constructed as a coplanar portion. The outer edge of the stage including the storage quadrant includes a lip or small extension with a locating pin 34 secured therein as by a threaded connection, not shown. The pin is located to engage the tab 12 on a transparency 7 to provide convenient location of the transparencies 7 after projection.

The stage is generally a rectangular member with the magazine quadrant of a width corresponding to that of a magazine and of a length sufficient to locate the center of gravity 35 of the magazine well within the quadrant. The magazine 8 can then be placed over the pin 19 without danger of falling from the stage 18. If a positive clamp is desired, a spring type clamp can be provided to fit over the pivot pin for positively holding of the magazine in position.

The common outer edge of the magazine and the reading quadrants are located from the pivot unit 9 generally in accordance with the width of the magazine 8.

The length of the reading quadrant generally is just slightly less than the length of the magazine. The storage quadrant has its outer edges located from the pivot pin 19 generally slightly less than the length of the transparencies 7 such that they are essentially completely supported except for the outermost edge portion.

A slot 36 is shown in the outer portion of the storage quadrant for carrying of the stage 18.

Each transparency 7 may also be provided with a manipulation notch, not shown, along the narrow lower outer edge. The notches in the adjacent transparencies would preferably be laterally offset by the width of the notch to permit ready manipulation of the transparency. It has been found that by proper selection of material, the transparencies are readily pivoted without the necessity of such notches and they are illustrated merely for purposes of showing a possible modification of considered desirable.

The locating pins 33 and 34 and gauge posts 31 are preferably provided with a relatively crowned top and of a minimum height in accordance with the functional requirements such that the transparencies are properly located in a relatively smooth movement of the transparencies without interference and without damage to the transparencies.

In use, the stage 18 is located on the projector 1 with the opening 24 aligned with the viewing window 2. The weight of the base 20 avoids the need for auxiliary clamping means. The magazine is mounted on the stage 18 with the pivot unit 9 telescopes over the pivot pin 19.

The first desired reference page and the related transparencies 7 of the magazine are pivoted as a group to the reading quadrant. An individual transparency 7 is then moved into viewing position with the tab 12 disposed between the guide posts 31 to automatically locate the transparency in the projection quadrant. Another transparency or transparencies may be similarly located on the projection quadrant in any desired sequence. For example, the first two, or any other combination of, transparencies may be superposed in perfect registry as a result of the pivot pin 19 and the interlock of the tabs 12 between the gauge posts. The second transparency may then be pivoted to the storage quadrant and the third transparency placed over the first transparency in similar essentially perfect position for viewing.

The operator completes the presentation of that group and then selects the next related groups.

The transparencies 7 are preferably formed with the information on the underside thereof. The stage is therefore constructed without any sharp edges or upward protrusions or burrs within the area over which a transparency moves and the locating pins or posts are provided with smooth crowned surfaces. This eliminates any danger of damaging the transparencies.

For convenience of handling the groups of transparencies, the operator may fan out the several groups within the magazine quardant prior to the starting of the presentation.

The present invention has been found to provide a highly improved system for visual transparency projection having increased flexibility with regard to presentation of material as well as to the assembly and modification of programs.

Various modes of carrying out the invention are contemplated as being within the scope of the following claims particularly pointing out and distinctly claiming the subject matter which is regarded as the invention.

We claim:

1. An accessory for projecting of transparencies from a projector having a horizontal light transmitting opening, a stage including a supporting wall adapted to be releasably secured to the projector overlying said opening and having a transmitting opening, said stage projecting laterally of the opening along at least one outer side of the projector to define a first support portion, a magazine of transparencies having pivot means interconnecting said transparencies along a marginal portion for pivotal movement of the transparencies to and from said transmitting opening, said stage and said pivot means including releasable interengaging members defining means to connect the magazine to the stage with said transparencies located for selective pivotal movement between the first support portion and the viewing opening, said support portion constructed to substantially conform to said magazine to define a first storage means, wherein said stage includes a second support portion projecting laterally of the opening along an outer side for temporary support and storage of the transparencies after alignment with the viewing portion.

2. The accessory of claim 1 wherein said stage includes a weighted portion aligned with the projector and relatively light-weight storage portions, said weighted portion being sufficient to support the stage thereon with the transparencies disposed in the storage portions of the stage.

3. The accessory of claim 1 wherein said interengaging members include a pin projecting upwardly from the stage and a tubular sleeve of essentially the same inside diameter as the outside diameter of the pin forming a part of the pivot means.

4. The accessory of claim 1 wherein said magazine has a greater length than width and said stage has a generally rectangular upper surface including a first quadrant aligned with the transmitting opening, a reading quadrant to one side and a storage quadrant to the opposite side of the first quadrant and a magazine quadrant between said reading and storage quadrant, the interengaging member of the stage being located generally centrally of the stage, said magazine quadrant having a width generally corresponding to the magazine and a length less than the magazine, the outer edge of the magazine quadrant being outwardly of the center of gravity of the magazine, the other quadrant substantially corresponding to the width and length of the magazine.

5. The accessory of claim 1 wherein said stage includes a weighted portion slightly larger than said transmitting opening, and an upper plate member secured thereto and extending outwardly therefrom to define said support portion.

6. An accessory for projecting of transparencies from a projector having a horizontal light transmitting opening, a stage including a supporting wall adapted to be releasably secured to the projector overlying said opening and having a transmitting opening, said stage projecting laterally of the opening along at least two outer sides of the projector to define a first storage portion and a second storage portion, said stage including means in the first storage portion to receive a plurality of transparencies having a bottom support member of a rigid material and interconnected by a pivot means permitting horizontal pivoting of the individual transparencies into viewing position overlying said opening and into said second storage portion for temporary storage after alignment with the viewing portion, said second storage portion being sufficiently large to essentially completely support a transparency placed thereon and said first storage portion being smaller than said second storage portion.

7. A transparency for projecting of information thereon by placement in preselected alignment upon an overhead projector having a horizontal support and a gauge means secured to the support, said transparency being adapted to be interconnected to a plurality of similar transparencies by a pivot connection and including a pivot aperture in a marginal portion of the transparency and a locating means on an offset edge of the transparency spaced from the aperture in accordance with the spacing of the gauge means from the pivot connection with said transparency disposed in said preselected alignment to produce an interlocking locating means for said transparency.

8. The transparency of claim 7 wherein said pivot aperture is provided in an upper left corner of the transparency and the locating means includes a projection formed on the diagonally opposite corner.

9. The transparency of claim 8 wherein said pivot aperture is a circular opening in an upper left corner of the transparency and the locating means is in the diagonally opposite corner, said locating means being a tab formed by recesses to opposite sides of the said opposite corner.

10. A magazine for an overhead projector having a pivot pin adjacent a horizontal transmitting area, including a plurality of transparencies carrying interrelated information for selective individual and multiple superimposed positioning on the horizontal transmitting means of a projector, comprising a pivot pin unit having a bottom opening interconnecting a corresponding point of said transparencies to permit pivotal movement of each transparency in its own plane, said bottom opening defining a pivot support means for cooperative engagement with a pivot pin, and having said pin unit secured to the upper left corner of the transparencies and a locating tab formed on the diametrically opposite corner.

References Cited

UNITED STATES PATENTS

| | | | |
|---|---|---|---|
| 2,560,110 | 7/1951 | Horn | 85—4 |
| 2,797,605 | 7/1957 | Metze et al. | 85—4 |
| 3,253,358 | 5/1966 | Wright | 88—24 |
| 3,279,109 | 10/1966 | Whittum | 40—106.1 |

NORTON ANSHER, *Primary Examiner.*

RICHARD M. SHEER, *Assistant Examiner.*

U.S. Cl. X.R.

40—106.1